(12) United States Patent
Abraham et al.

(10) Patent No.: US 11,809,453 B2
(45) Date of Patent: Nov. 7, 2023

(54) TWO-ROUND BYZANTINE FAULT TOLERANT (BFT) STATE MACHINE REPLICATION (SMR) PROTOCOL WITH LINEAR AUTHENTICATOR COMPLEXITY AND OPTIMISTIC RESPONSIVENESS

(71) Applicant: VMware, Inc., Palo Alto, CA (US)

(72) Inventors: Ittai Abraham, Tel Aviv (IL); Ioan Alin Tomescu Nicolescu, Mountain View, CA (US); Guy Golan Gueta, Holon (IL); Neil Giridharan, Palo Alto, CA (US); Heidi Howard, Cambridge (GB)

(73) Assignee: VMware, Inc., Palo Alto, CA (US)

( * ) Notice: Subject to any disclaimer, the term of this patent is extended or adjusted under 35 U.S.C. 154(b) by 349 days.

(21) Appl. No.: 17/339,068

(22) Filed: Jun. 4, 2021

(65) Prior Publication Data
US 2022/0391410 A1   Dec. 8, 2022

(51) Int. Cl.
G06F 16/27        (2019.01)
G06F 16/2453      (2019.01)
H04L 9/00         (2022.01)
G06F 11/00        (2006.01)

(52) U.S. Cl.
CPC ............ G06F 16/275 (2019.01); G06F 11/00 (2013.01); G06F 16/24535 (2019.01); G06F 16/27 (2019.01); H04L 9/50 (2022.05)

(58) Field of Classification Search
CPC ...... G06F 16/27; G06F 16/275; G06F 11/197; H04L 9/50
See application file for complete search history.

(56) References Cited

U.S. PATENT DOCUMENTS

| | | | |
|---|---|---|---|
| 8,230,253 B2 | 7/2012 | Butterworth | |
| 10,664,353 B2 | 5/2020 | Karame et al. | |
| 10,713,133 B2* | 7/2020 | Abraham | H04L 67/1095 |
| 2018/0307573 A1 | 10/2018 | Abraham et al. | |
| 2019/0354518 A1* | 11/2019 | Zochowski | G06F 16/2379 |
| 2020/0117657 A1* | 4/2020 | Xie | G06Q 40/04 |

OTHER PUBLICATIONS

PCT International Search Report and Written Opinion for PCT/US22/14038 dated Apr. 18, 2022, 6 pages.

* cited by examiner

Primary Examiner — Marcin R Filipczyk (57) ABSTRACT

The present disclosure is directed to a leader-based partially synchronous BFT SMR protocol that improves upon existing protocols by exhibiting two rounds of communication latency, linear authenticator complexity, and optimistic responsiveness. This is achieved through the novel use of an aggregate signature scheme as part of the protocol's view-change procedure.

21 Claims, 7 Drawing Sheets

FIG. 7

TWO-ROUND BYZANTINE FAULT TOLERANT (BFT) STATE MACHINE REPLICATION (SMR) PROTOCOL WITH LINEAR AUTHENTICATOR COMPLEXITY AND OPTIMISTIC RESPONSIVENESS

BACKGROUND

Unless specifically indicated herein, the approaches described in this section should not be construed as prior art to the claims of the present application and are not admitted to be prior art by inclusion in this section.

Byzantine fault tolerance (BFT) refers to the ability of a computing system to endure arbitrary failures that would otherwise prevent the system's components from reaching consensus on decisions critical to the system's operation. In the context of state machine replication (SMR) (i.e., a scenario where a system provides a service whose operations and state are replicated across multiple nodes, known as replicas), BFT SMR protocols are used to ensure that non-faulty replicas are able to agree on a common order of execution for client-requested service commands. This, in turn, ensures that the non-faulty replicas will execute the client commands in an identical and thus consistent manner.

There are a wide range of existing BFT SMR protocols, many of which are leader-based and partially synchronous. A leader-based BFT SMR protocol generally proceeds according to a series of iterations, known as views, and relies on a designated leader replica (henceforth referred to as simply "leader") to drive a consensus decision in each view. If the leader is determined to be faulty or if the protocol reaches a predefined leader rotation point, the leader is replaced with another replica via a view-change procedure.

A partially synchronous BFT SMR protocol runs in a network that conforms to the partially synchronous communication model, which means there is a known upper bound $\Delta$ on message transmission delays in the network after an unknown point in time referred to as Global Stabilization Time (GST). For such protocols, the total number of replicas n must be greater than or equal to 3f+1 (where f is the maximum number of faulty replicas) in order for the protocol to guarantee that all honest (i.e., non-faulty) replicas will agree on the same execution sequence number for each client command (the property of "safety") and that each client command will eventually be assigned an agreed-upon execution sequence number after GST (the property of "liveness").

Three metrics that are commonly used to compare the efficiency and performance of leader-based partially synchronous BFT SMR protocols are communication latency, authenticator complexity, and optimistic responsiveness. Communication latency refers to the number of communication rounds, or in other words network round-trips, that are needed between replicas to reach a consensus decision (e.g., an agreed-upon execution sequence number) for a client command, given an honest leader and after GST. Authenticator complexity refers to the number of authenticators, such as digital signatures or message authentication codes (MACs), that a replica receives during the course of a single "consensus slot," which is the protocol processing required to reach a single consensus decision (including any necessary view-changes). And optimistic responsiveness refers to the ability of the leader to drive the protocol to consensus after GST in a length of time that depends solely on the actual message transmission delays in the network (and not on known upper bound $\Delta$).

From a performance perspective, it would be ideal for a leader-based partially synchronous BFT SMR protocol to exhibit (1) two rounds (or less) of communication latency, (2) linear authenticator complexity, and (3) optimistic responsiveness, while of course maintaining safety and liveness.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to a leader-based partially synchronous BFT SMR protocol that exhibits two rounds of communication latency, linear authenticator complexity, and optimistic responsiveness. This is achieved through the novel use of an aggregate signature scheme as part of the protocol's view-change procedure.

With this aggregate signature scheme, the leader of the new view can succinctly communicate the view numbers of the locked quorum certificates it is aware of to each replica via a single authenticator (i.e., aggregate signature), rather that via O(n) authenticators. Further, each receiving replica can efficiently verify the view numbers via a constant number of cryptographic operations. These and other aspects are described in further detail below.

2. System Environment and High-Level Protocol Description

Figure 1:
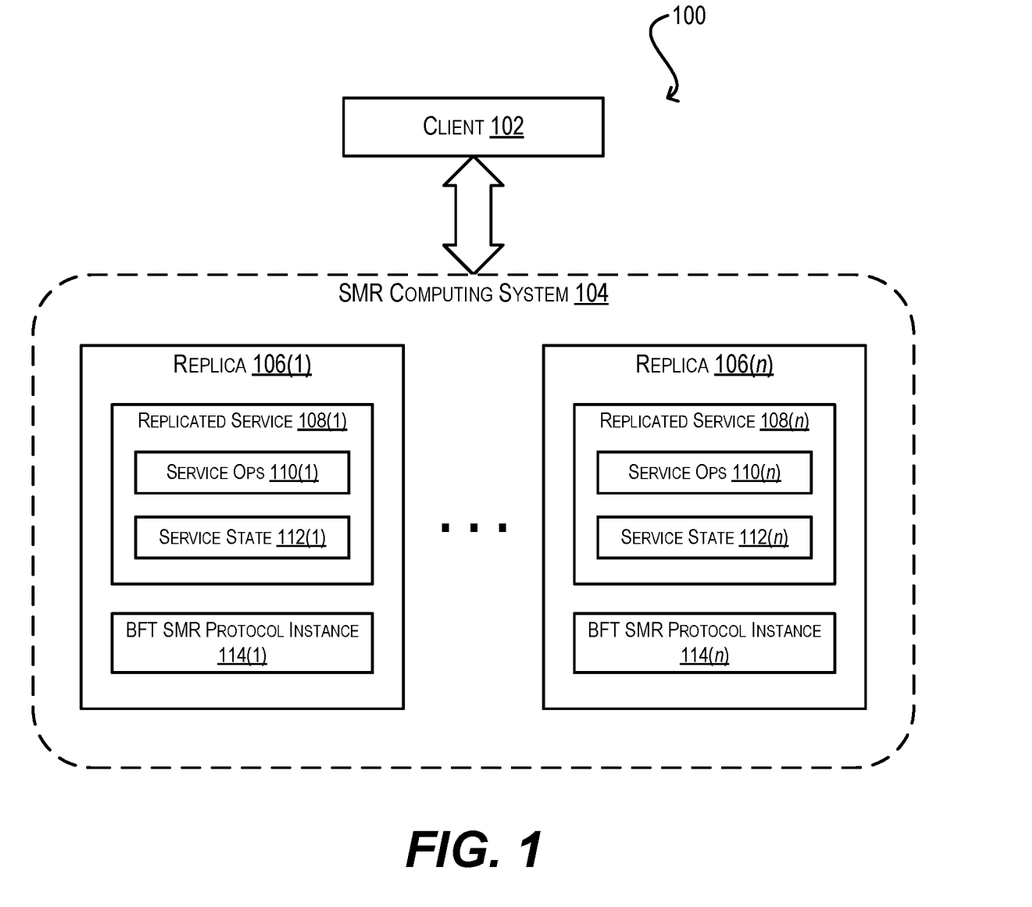
FIG. 1 depicts a system environment according to certain embodiments.

FIG. 1 is a simplified block diagram of a system environment 100 in which embodiments of the present disclosure may be implemented. System environment 100 includes a client 102 and an SMR-based computing system 104 that comprises n replicas 106(1)-(n) interconnected via a network (not shown). Each replica 106 may be a physical or virtual machine and is configured to run an identical instance of a replicated service 108 (e.g., a data storage service, a blockchain service, etc.) comprising one or more service operations 110 and a service state 112. Client 102 consumes replicated service 108 by submitting commands to replicas 106(1)-(n) for executing service operations 110. In response, each replica 106 executes the client commands and updates its service state 112 to reflect the results of those command executions.

To ensure that replicas 106(1)-(n) sequence the execution of the commands submitted by client 102 in an identical fashion and thus maintain consistent service states, SMR-based computing system 104 runs an instance of a leader-based partially synchronous BFT SMR protocol (reference numeral 114) on each replica. Examples of existing leader-based partially synchronous BFT SMR protocols include Practical BFT (PBFT), HotStuff, SBFT, and Tendermint. As mentioned previously, a leader-based partially synchronous BFT SMR protocol relies on one or more leaders to drive consensus decisions over a succession of views and is subject to the constraints of a partially synchronous network, which requires a total of 3f+1 replicas (where at most f are faulty) for safety and liveness. Of the universe of existing leader-based partially synchronous BFT SMR protocols, several exhibit two of the following three desirable properties: two rounds (or less) of communication latency, linear authenticator complexity, and optimistic responsiveness. For example, PBFT exhibits two-round communication latency and optimistic responsiveness. As another example, HotStuff exhibits optimistic responsiveness and linear authenticator complexity. However, none exhibit all three.

Figure 2:
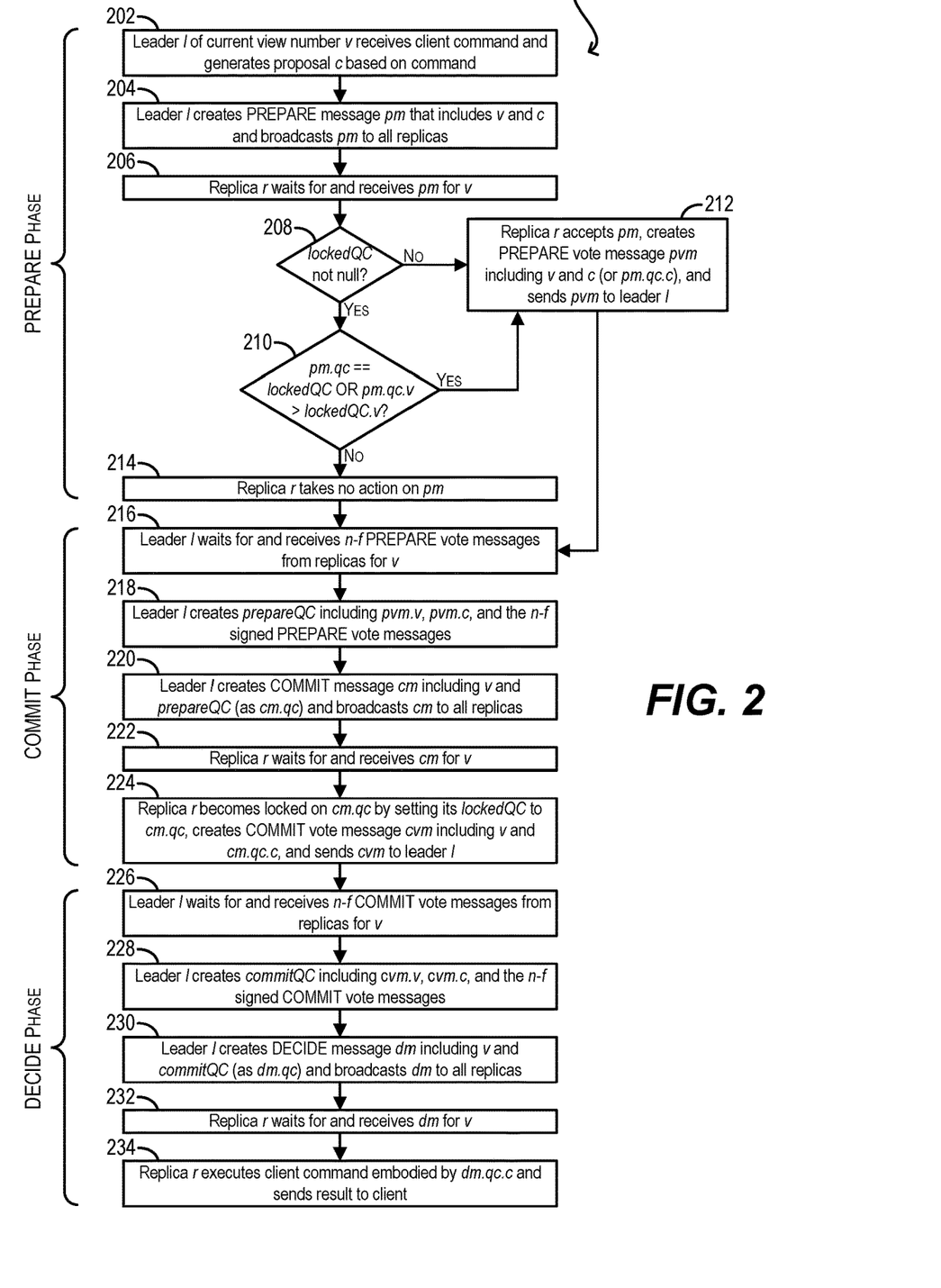
FIGS. 2 and 3 depict workflows of a hypothetical two-round leader-based partially synchronous BFT SMR protocol according to certain embodiments.
Figure 3:
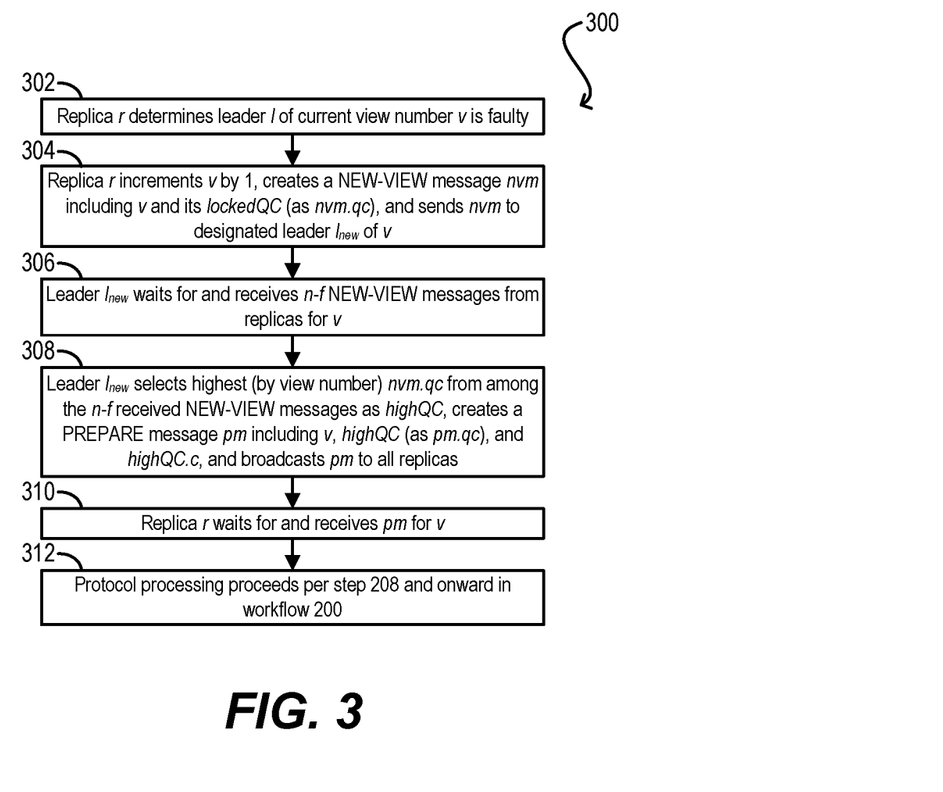

A key reason why existing protocols like PBFT and HotStuff do not exhibit all three of the foregoing properties is an issue known as the hidden lock problem. To set the stage for explaining what the hidden lock problem is, FIGS. 2 and 3 depict workflows 200 and 300 of a hypothetical two-round, stable leader version of HotStuff that is susceptible to this problem. "Stable leader" means that a leader is designated at the start of the protocol and drives protocol processing through multiple consensus decisions as long as the leader is honest; if the leader is deemed to be faulty, the protocol undergoes a view-change procedure to replace the leader with another replica. Workflow 200 presents the normal-case operation of the protocol for a single consensus slot/view and workflow 300 presents the view-change procedure of the protocol.

The main algorithmic difference between the hypothetical protocol shown in FIGS. 2 and 3 and conventional stable leader HotStuff is that the PRE-COMMIT phase of HotStuff is removed, resulting in three phases (PREPARE, COMMIT, and DECIDE) per consensus slot/view, rather than the four phases in conventional HotStuff (PREPARE, PRE-COMMIT, COMMIT, and DECIDE). Of these three phases, only the PREPARE and COMMIT phases require round-trip communication between replicas, thereby achieving two rounds of communication latency. This hypothetical protocol retains the linear authenticator complexity and optimistic responsiveness of conventional HotStuff.

For brevity, workflows 200 and 300 assume that every protocol message communicated between replicas is digitally signed by the sender and the receiver verifies the digital signature upon message receipt. Any one of a number of digital signature schemes may be used for this purpose, including threshold signatures or multi-signatures.

In addition, these workflows assume that each replica maintains for bookkeeping purposes a variable v (initialized to 1) tracking the current view number and a variable lockedQC (initialized to null) storing the highest (by view number) quorum certificate that the replica is locked on. The concepts of a "quorum certificate" and being "locked on" a quorum certificate are explained in the description of workflow 200 below.

Starting with step 202 of workflow 200 (which mark the start of the PREPARE phase), a designated leader l of current view number v can receive a command to execute a service operation from a client (e.g., client 102 of FIG. 1) and can generate a proposal c based on the client command. In various embodiments, proposal c can comprise the command itself and a sequence number indicating a proposed order in which the command should be executed relative to other client commands.

At step 204, leader l can create a PREPARE message pm that includes current view number v as pm.v and proposal c as pm.c and can broadcast pm to all replicas. As used herein, the act of "broadcasting" a message includes sending the message to yourself (i.e., the broadcaster).

At step 206, each replica r can wait for and receive PREPARE message pm sent by leader l for current view number v. In response, replica r can check whether it is locked on a quorum certificate (i.e., its lockedQC variable is not null) (step 208). If the answer is yes, replica r can further check whether (1) a quorum certificate included in pm (i.e., pm.qc), if any, is identical to lockedQC, OR (2) the view number of the quorum certificate included in pm (i.e., pm.qc.v) is greater than the view number of lockedQC (i.e., lockedQC.v) (step 210). If the answer to step 210 is yes or if the answer to step 208 is no, replica r can accept pm, create a PREPARE vote message pvm that includes current view number v as pvm.v and proposal c as pvm.c (or alternatively proposal pm.qc.c as pvm.c, if pm.qc is not null), and send pvm to leader l (step 212).

On the other hand, if the answer at step 210 is no, replica r can take no action on PREPARE message pm because replica r is locked on a quorum certificate (via its lockedQC) that has a higher view number that pm.QC (or an equivalent view number with a different proposal) (step 214).

At step 216 (which marks the start of the COMMIT phase), leader l can wait for and receive n-f PREPARE vote messages pvm sent by the replicas for current view number v. In response, leader l can create a quorum certificate prepareQC that includes view number pvm.v as prepareQC.v, proposal pvm.c as prepareQC.c, and the n-f signed PREPARE vote messages (either in the form of a single authenticator or n-f authenticators) as prepareQC.justify (step 218). Because prepareQC includes the signed PREPARE vote messages it received from the replicas, it can be understood as a verifiable proof or certificate that a quorum (i.e., n-f) of replicas voted for, or in other words accepted, proposal prepareQC.c during the PREPARE phase of view number prepareQC.v. Leader l can then create a COMMIT message cm that includes current view number v as cm.v and prepareQC as cm.qc and can broadcast cm to all replicas (step 220).

At step 222, each replica r can wait for and receive COMMIT message cm sent by leader l for current view number v. In response, replica r can become locked on to cm.qc (i.e., the prepareQC quorum certificate created by leader l at step 218) by setting its lockedQC variable to cm.qc, create a COMMIT vote message cvm that includes current view number v as cvm.v and proposal cm.qc.c as cvm.c, and send cvm to leader l (step 224).

At step 226 (which marks the start of the DECIDE phase), leader l can wait for and receive n-f COMMIT vote messages cvm sent by the replicas for current view number v. In response, leader l can create a quorum certificate commitQC that includes view number cvm.v as commitQC.v, proposal cvm.c as commitQC.c, and the n-f signed COMMIT vote messages (either in the form of a single authenticator or n-f authenticators) as commitQC.justify (step 228). Because commitQC includes the signed COMMIT vote messages it received from the replicas, it can be understood as a verifiable proof or certificate that a quorum (i.e., n-f) of replicas voted for, or in other words accepted, proposal commitQC.c during the COMMIT phase of view number commitQC.v. Leader l can then conclude that proposal commitQC.c is a consensus decision, create a DECIDE message dm that includes current view number v as dm.v and commitQC as dm.qc, and broadcast dm to all replicas (step 230).

At step 232, each replica r can wait for and receive DECIDE message dm sent by leader l for current view number v. Finally, at step 234, replica r can execute the client command embodied by proposal dm.qc.c and can send a result of that execution to the originating client.

Turning now to the view-change procedure presented in workflow 300, at step 302, a replica r can determine that leader l of current view number v is faulty due to, e.g., failing to receive an expected message from leader l in the PREPARE, COMMIT, or DECIDE phases within a predetermined timeout period (or some other issue). In response, replica r can increment current view number v by 1 (such that v is now v+1), create a NEW-VIEW message nvm that includes current view number v as nvm.v and its lockedQC as nvm.qc, and send nvm to the new designated leader $l_{new}$ of current view number v (step 304).

At step 306, leader $l_{new}$ can wait for and receive n-f NEW-VIEW messages nvm for current view number v. In response, leader $l_{new}$ can select the highest (by view number) nvm.qc from among the n-f NEW-VIEW messages it has received (or its own lockedQC if it is highest) as highQC, create a PREPARE message pm that includes current view number v as pm.v, highQC as pm.qc, and the proposal of highQC (i.e., highQC c) as pm.qc.c, and broadcast pm to all replicas (step 308).

At step 310, each replica r can wait for and receive PREPARE message pm sent by leader l for current view number v. Finally, replica r can proceed to check whether to accept pm in accordance with the logic starting at step 208 of workflow 200, and the protocol processing can merge back into the normal-case operation presented in the remaining steps of workflow 200 (step 312).

With this hypothetical protocol description in mind, the hidden lock problem may manifest in the protocol as follows. Assume that during a view number x, an honest replica h becomes locked on a prepareQC specifying x and a view-change to view number x+1 occurs before the proposal of this prepareQC (i.e., prepareQC.c) can be committed. Further assume that during the view-change, the new leader $l_{new}$ does not receive a NEW-VIEW message from replica h (which can occur because leader $l_{new}$ moves on with its PREPARE phase processing as soon as it receives n-f NEW-VIEW messages, which allows for optimistic responsiveness); instead, leader $l_{new}$ receives NEW-VIEW messages from some combination of honest and faulty replicas, with the highest (by view number) quorum certificate from among all of the NEW-VIEW messages it has received being a valid quorum certificate highQC with a view number y<x.

In this scenario, leader $l_{new}$ will broadcast a PREPARE message pm that includes highQC as pm.qc. However, when replica h receives pm, replica h will take no action on pm per the logic at steps 206-214 of workflow 200 because the view number of h's lockedQC (i.e., x) is higher than the view number of pm.qc.v (i.e., y), despite the fact that pm.qc is valid. This, in turn, results in a liveness issue because replica h is an honest replica and partially synchronous BFT SMR protocols generally depend on the participation of all honest replicas to make forward progress.

It possible to overcome the hidden lock problem by introducing another round of voting between the PREPARE and COMMIT phases, which can ensure that all honest replicas participate in the view-change; this is the approach that conventional HotStuff employs. However, introducing another voting round increases the communication latency of the protocol from two rounds to three.

It is also possible to overcome the hidden lock problem by having leader $l_{new}$ include, in the PREPARE message it broadcasts to replicas, all of the locked quorum certificates it is aware of; this is the approach that PBFT employs. In the example above, this would enable replica h to verify that none of the replicas that participated in the view-change are/were locked on a quorum certificate with a higher view number than what was proposed (i.e., y), and thus replica h can be convinced that it is safe to accept the PREPARE message, despite being locked on higher view number x. However, this approach increases the authenticator complexity of the protocol from linear (i.e., O(n)) to quadratic (i.e., $O(n^2)$) because the PREPARE message will include n-f quorum certificates and is broadcast to n replicas.

To address the foregoing, embodiments of the present invention provide a novel leader-based partially synchronous BFT SMR protocol, referred to herein as "efficient BFT" (eBFT), that incorporates at least four enhancements to the example shown in FIGS. 2 and 3. At a high level, the four enhancements are:

1. Implementation of a new bootstrapping phase prior to protocol execution that is used to generate and distribute, for each replica r, a set of secret and public keys $[sk_{r,1}, sk_{r,2}, \ldots sk_{r,t}]$ and $[pk_{r,1}, pk_{r,2}, \ldots, pk_{r,t}]$, where t is the number of bits used to express a "view delta" value $v_d$ for replica r in binary.
2. Modification of the view-change logic executed by each replica r at steps 302-304 of workflow 300 such that replica r: (a) computes its $v_d$ as the difference between current view number v and the view number of the QC on which it is locked (i.e., lockedQC.v)), (b) computes a signature share $s_r$ that effectively signs the replica's $v_d$ value using its secret keys $[sk_{r,1}, sk_{r,2}, \ldots, sk_{r,t}]$, and (c) includes $v_d$ and $s_r$ in the NEW-VIEW message that replica r sends to leader $l_{new}$.
3. Modification of the PREPARE phase processing performed by leader $l_{new}$ at steps 306-308 of workflow 300 such that leader $l_{new}$: (a) converts the $v_d$ value included in each of the n-f NEW-VIEW messages it receives into a binary representation (i.e., bit vector), (b) combines the converted bit vectors into a set of bit vectors bvs, (c) combines the signature shares $s_r$ included in the n-f NEW-VIEW messages into an aggregate signature s, and (d) includes bvs and $s_r$ the PREPARE message that leader $l_{new}$ broadcasts to all replicas.
4. Modification of the PREPARE phase processing performed by each replica r at steps 206-214 of workflow 200 such that, in the case where the view number of the quorum certificate on which replica r is locked (i.e., lockedQC.v) is higher than the view number of the quorum certificate included in the PREPARE message (i.e., pm.qc.v), replica r proceeds to check for a hidden lock scenario by verifying aggregate signature s using the public keys distributed during the bootstrapping phase, thereby verifying that the $v_d$ values in bvs are authentic. Assuming this verification is successful (and assuming all of the $v_d$ values in bvs are consistent with pm.qc.v), replica r can be convinced that there was no commit after pm.qc.v and can accept the PREPARE message, despite holding a lock on a higher (by view number) quorum certificate.

With the enhancements above, eBFT can advantageously exhibit two-round communication latency, linear authenticator complexity, and optimistic responsiveness, all while avoiding the hidden lock problem (and thus guaranteeing safety and liveness after GST). In addition, due to the particular nature of aggregate signature s, each replica r can verify s using a constant number of cryptographic operations, rather than using O(n) operations, resulting in further improvements in protocol speed and efficiency.

The remaining sections of this disclosure provide workflows for implementing enhancements (1)-(4), including cryptographic details on how each signature share $s_r$ may be created and how aggregate signature s may be verified. It should be appreciated that FIGS. 1-3 and the foregoing description are illustrative and not intended to limit embodiments of the present disclosure. For example, although FIG. 1 depicts a particular arrangement of entities and components within system environment 100, other arrangements are possible (e.g., the functionality attributed to a particular entity/component may be split into multiple entities/components, entities/components may be combined, etc.).

Further, while the present disclosure frames eBFT as an enhanced two-round variant of HotStuff and thus uses certain terminology and conventions from the HotStuff protocol for purposes of explanation/illustration (e.g., the PREPARE, COMMIT, and DECIDE phases and their corresponding messages and quorum certificates, replica-to-leader communication, etc.), the embodiments described herein are not necessarily tied to those terms and conventions, or to HotStuff in particular. Instead, the general concepts of this disclosure, which include the novel use of aggregate signatures to overcome the hidden lock problem, may be broadly applied to any leader-based partially synchronous BFT SMR protocol, either currently known or yet to be developed, in order to achieve the desirable properties of two-round (or lower) communication latency, linear authenticator complexity, and optimistic responsiveness.

3. Key Generation/Distribution for Aggregate Signature Scheme

Figure 4:
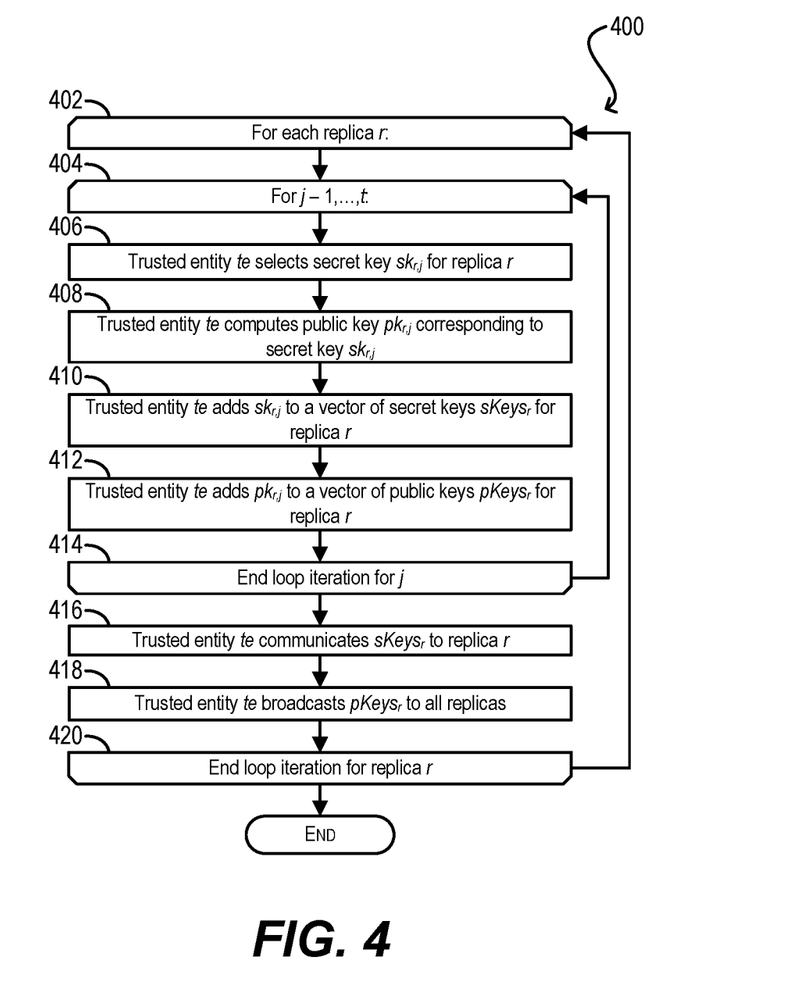
FIG. 4 depicts a workflow for generating and distributing secret/private keys for an aggregate signature scheme according to certain embodiments.

FIG. 4 depicts a workflow 400 for implementing the bootstrapping process of eBFT, which involves generating and distributing secret/private keys that each replica r can use for creating its signature share $s_r$ during a view-change and verifying aggregate signature s during the PREPARE phase. Workflow 400 assumes this process is carried out by a trusted entity te that is communicatively coupled with each replica r.

Starting with steps 402 and 404, trusted entity te can enter a first loop for each replica r and a second loop for j=1, . . . , t, where t is the number of bits used to express $v_d$ for replica r in binary. Within the second loop, trusted entity te can select a secret key $sk_{r,j}$, either randomly or through some other method (step 406). Trusted entity te can further compute a public key $pk_{r,j}$ corresponding to $sk_{r,j}$ using any key generation scheme known in the art (step 408). For example, in a particular embodiment $pk_{r,j}$ can be computed as $$\left(\left(g_2^{sk_{r,j}}\right), \pi_{PoK}\right),$$

where $g_2$ is a primitive root and $\pi_{PoK}$ is a proof of knowledge of $sk_{r,j}$ with respect to $$g_2^{sk_{r,j}}.$$

At steps 410 and 412, trusted entity te can add $sk_{r,j}$ to a vector of secret keys $sKeys_r$ for replica r and add $pk_{r,j}$ to a vector of public keys $pKeys_r$ for replica r. Trusted entity te can then reach the end of the current iteration of the second loop (step 414) and proceed to the next j.

Upon completing the second loop for current replica r, trusted entity te can communicate $sKeys_r$, which comprises $[sk_{r,1}, sk_{r,2}, \ldots, sk_{r,t}]$, to replica r (step 416) and broadcast $pKeys_r$, which comprises $[pk_{r,1}, pk_{r,2}, \ldots, pk_{r,t}]$, to all replicas (step 418). Trusted entity te can then reach the end of the current iteration of the first loop (step 420) and proceed to the next replica r. Finally, upon completion of the first loop, the bootstrapping phase can end.

4. View-Change Procedure by Replicas

Figure 5:
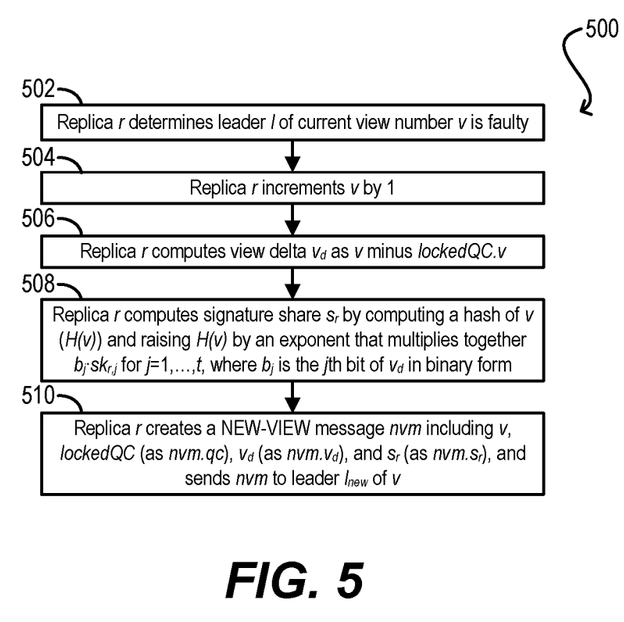
FIG. 5 depicts a workflow that may be performed by a replica as part of the view-change procedure of the protocol of FIGS. 2 and 3 according to certain embodiments.

FIG. 5 depicts a workflow 500 that may be executed by each replica r for carrying out a view-change from a current view number v to a new view number v+1 in accordance with eBFT. In various embodiments, replica r may execute workflow 500 in the context of view-change workflow 300 of FIG. 3, as a replacement for steps 302-304 of workflow 300.

Starting with steps 502 and 504, replica r can determine that leader l of current view number v is faulty due to, e.g., failing to receive an expected message from leader l in the PREPARE, COMMIT, or DECIDE phases within a predetermined timeout period (or some other issue) and can increment current view number v by 1 (such that v is now v+1).

Upon incrementing v, replica r can compute a view delta value $v_d$ as v minus the view number of its lockedQC (i.e., lockedOC.v) (step 506). Replica r can then compute a signature share $s_r$ by taking a hash of v (i.e., H(v)) and raising H(v) by an exponent that multiples together a series of expressions $b_j \cdot sk_{r,j}$, where $b_j$ denotes the jth bit of $v_d$ in binary form (step 508). Stated another way, the exponent is a product of the secret keys in $sKeys_r$, but the product only includes a given $sk_{r,j}$ if the jth bit of replica r's $v_d$ (in binary form) is 1. This can be expressed as follows:

$$s_r = \Pi_{j \in [1,t]} H(v)^{b_j \cdot sk_{r,j}} \quad \text{Listing 1}$$

Finally, replica r can create a NEW-VIEW message nvm that includes current view number v as nvm.v, its locked QC lockedQC as nvm.qc, view delta value $v_d$ as nvm.$v_d$, and signature share $s_r$ as nvm.$s_r$, and can send nvm to the new designated leader $l_{new}$ of current view number v (step 510).

5. Prepare Phase Processing by New Leader after View-Change

Figure 6:
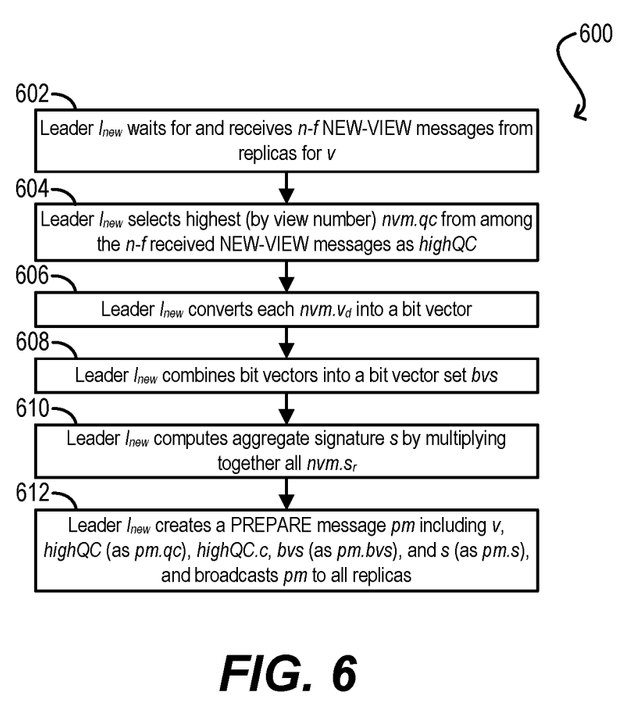
FIG. 6 depicts a workflow that may be performed by a leader as part of the PREPARE phase of the protocol of FIGS. 2 and 3 according to certain embodiments.

FIG. 6 depicts a workflow 600 that may be executed by leader $l_{new}$ for carrying out the PREPARE phase of view number v after a view-change (from v−1 to v) in accordance with eBFT. In various embodiments, leader $l_{new}$ may execute workflow 600 in the context of view-change workflow 300 of FIG. 3, as a replacement for steps 306-308 of workflow 300.

Starting with step 602, leader $l_{new}$ can wait for and receive n-f NEW-VIEW messages nvm for current view number v. In response, leader $l_{new}$ can select the highest (by view number) nvm.qc from among the n-f NEW-VIEW messages it has received (or its own lockedQC if it is highest) as highQC (step 604).

At steps 606 and 608, leader $l_{new}$ can convert each view delta value $v_d$ included in the received NEW-VIEW messages into binary form (e.g., bit vectors) and combine these bit vectors into a bit vector set bvs. Further, at step 610, leader $l_{new}$ can compute an aggregate signature s by multiplying together (i.e., taking the product of) all of the signature shares $s_r$ included in the received NEW-VIEW messages.

Finally, leader $l_{new}$ can create a PREPARE message pm that includes current view number v as pm.v, highQC as pm.qc, highOC.c as pm.qc.c, bit vector set bvs as pm.bvs, and aggregate signature s as pm.s, and can broadcast pm to all replicas (step 612).

6. Prepare Phase Processing by Replicas

Figure 7:
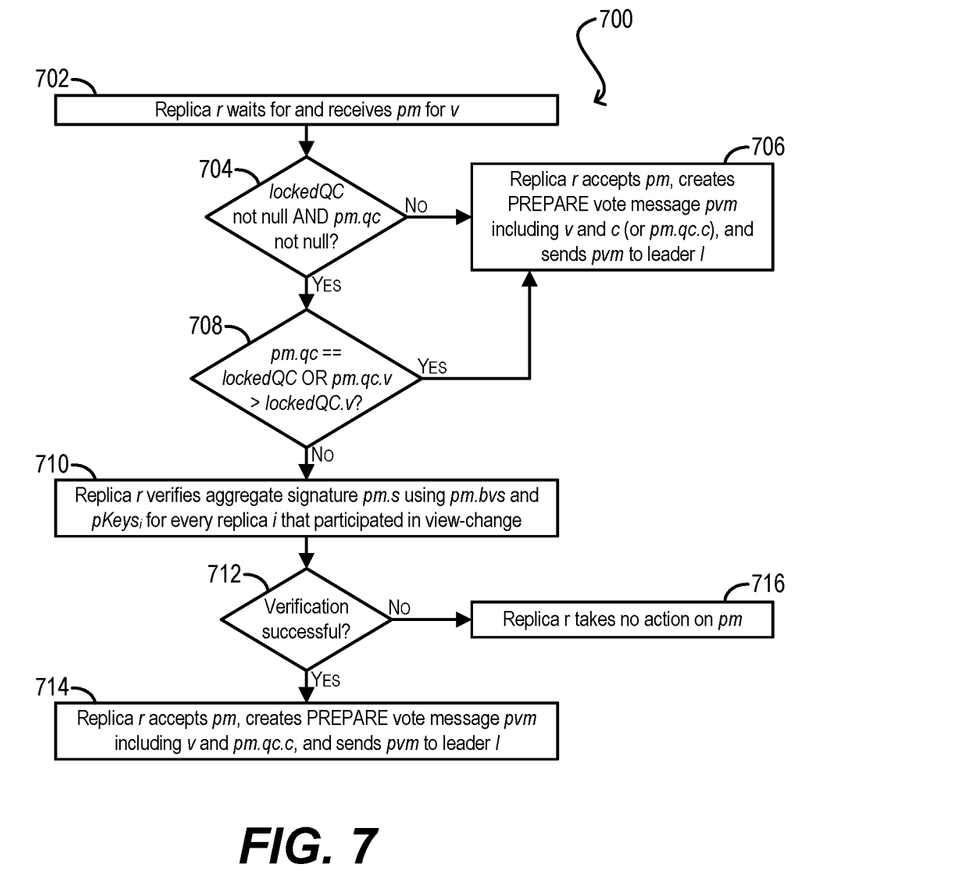
FIG. 7 depicts a workflow that may be performed by a replica as part of the PREPARE phase of the protocol of FIGS. 2 and 3 according to certain embodiments.

FIG. 7 depicts a workflow 700 that may be executed by each replica r for carrying out the PREPARE phase of current view number v in accordance with eBFT. In various embodiments, replica r may execute workflow 700 in the context of workflow 200 of FIG. 2, as a replacement for steps 206-214 of workflow 200.

Starting with step 702, replica r can wait for and receive PREPARE message pm for current view number v. In response, replica r can check whether (a) it is locked on a quorum certificate (i.e., its lockedQC is not null) AND (b) pm includes a quorum certificate (i.e., pm.qc is not null) (step 704). If the answer is no, replica r can accept pm, create a PREPARE vote message pvm that includes current view number v as pvm.v and proposal c as pvm.c (or alternatively pm.qc.c as pvm.c, if pm.qc is not null), and send pvm to the leader (step 706).

If the answer at step 704 is yes, replica r can further check whether (a) pm.qc is identical to lockedQC OR (2) the view number of pm.qc (i.e., pm.qc.v) is greater than the view number of lockedQC (i.e., lockedQC.v) (step 708). If the answer at step 708 is yes, replica r can accept pm, create a PREPARE vote message pvm, and send pvm to the leader per previously described step 706.

If the answer at step 708 is no, replica r can check for a hidden lock by verifying aggregate signature s included in pm (i.e., pm.s), thereby verifying that pm.bvs—which includes the bit vector representations of the $v_d$ values for the various replicas that participated in the view-change—is correct (steps 710 and 712). In a particular embodiment, replica r can perform this verification by computing, for each replica i that participated in the view-change (i.e., sent a NEW-VIEW message to leader $l_{new}$), a value $u_i$ as follows:

$$u_i = \prod_{j \in [1,t]} g^{b_j \cdot pk_{i,j}} \quad \text{Listing 2}$$

In this equation, g is a primitive root and $b_j$ denotes the jth bit of $v_d$ for replica i in binary form. Replica r has access to the $v_d$ value for each replica i via pm.bvs.

Upon computing $u_i$ for each replica i, replica r can compute an aggregated value u as the product of all $u_i$ and can check whether the following pairing operation (denoted by e) is true:

$$e(s, g_2) = e(H(v), u) \quad \text{Listing 3}$$

If this pairing operation is true (which means the verification of aggregate signatures is successful), replica r can conclude that pm.bvs is authentic. Accordingly, replica r can accept pm, create a PREPARE vote message pvm that includes current view number v as pvm.v and proposal pm.qc.c as pvm.c, and send pvm to the leader (step 714).

However, if the pairing operation is false (which means the verification of aggregate signature s is unsuccessful), replica r can take no action on pm (step 716). Workflow 700 can subsequently end.

Note that, per the check at step 708, replica r only proceeds with verifying aggregate signature s if replica r's lockedQC has a different proposal and a higher view number than the quorum certificate included in PREPARE message pm; in all other instances replica r does not need aggregate signature s (or bit vector set bvs) Accordingly, in certain embodiments the processing of workflows 600 and 700 can be optimized such that leader $l_{new}$ initially broadcasts a PREPARE message to all replicas that does not include s or bvs. In the case where a particular replica r needs this information in order to check for a hidden lock, replica r can send a notification to that effect to leader $l_{new}$ and leader $l_{new}$ can provide aggregate signature s and bit vector set bvs to replica r via another message. This optimization advantageously reduces the size of the PREPARE message for the most common protocol execution path (i.e., the path in which no hidden lock problem occurs).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method for implementing a Byzantine fault tolerant (BFT) state machine replication (SMR) protocol running on a computing system comprising n replicas, the method comprising:
   receiving, by a leader replica in the n replicas for a current view number of the BFT SMR protocol, n-f NEW-VIEW messages from other replicas in the n replicas, wherein f is a maximum number of replicas in the n replicas that may be faulty, and wherein each NEW-VIEW message in the n-f NEW-VIEW messages includes a null or non-null quorum certificate, a view delta value, and a signature share;
   selecting, by the leader replica, a high quorum certificate from among the non-null quorum certificates in the n-f NEW-VIEW messages, the high quorum certificate being a quorum certificate associated with a highest view number;
   converting, by the leader replica, the view delta value in each NEW-VIEW message into a bit vector, resulting in n-f bit vectors;
   combining, by the leader replica, the n-f bit vectors into a bit vector set;
   computing, by the leader replica, an aggregate signature by multiplying together the signatures shares in the n-f NEW-VIEW messages;
   creating a PREPARE message that includes the current view number, the high quorum certificate, the bit vector set, and the aggregate signature; and
   broadcasting, by the leader replica, the PREPARE message to the n replicas.

2. The method of claim 1 wherein, for each NEW-VIEW message in the n-f NEW-VIEW messages received from a replica i in the n replicas, the signature share included in the NEW-VIEW message is computed by:
   calculating a hash of the current view number; and
   raising the hash by an exponent that is computed as $\Pi_{j=1,\ldots,t} b_j \cdot sk_{i,j}$, wherein t is a number of bits used to represent the view delta value included in the NEW-VIEW message in binary form, wherein $b_j$ is a jth bit of the view delta value in binary form, and wherein $sk_{i,j}$ for $j=1,\ldots,t$ correspond to a set of secret keys of replica i.

3. The method of claim 1 wherein, for each NEW-VIEW message in the n-f NEW-VIEW messages including a non-null quorum certificate, the view delta value included in the NEW-VIEW message is a delta between the current view number and a view number associated with the non-null quorum certificate.

4. The method of claim 1 wherein upon receiving the PREPARE message, a replica r in the n replicas is configured to:
   determine that replica r is locked on a quorum certificate that is associated with a higher view number than the high quorum certificate included in the PREPARE message; and
   verify the aggregate signature included in the PREPARE message using the current view number, the bit vector set, and a plurality of public keys associated with replicas that originally transmitted in the n-f NEW-VIEW messages.

5. The method of claim 4 wherein upon determining that the verification of the aggregate signature is successful, replica r is further configured to:
   accept the PREPARE message; and
   send a PREPARE vote message to the leader replica that includes a proposal associated with the high quorum certificate included in the PREPARE message.

6. The method of claim 4 wherein upon determining that the verification of the aggregate signature is unsuccessful, replica r is further configured to:
   take no action on the PREPARE message.

7. The method of claim 1 wherein the BFT SMR protocol exhibits two rounds of communication latency, linear authenticator complexity, and optimistic responsiveness.

8. A non-transitory computer readable storage medium having stored thereon program code executable by a leader replica in a computing system comprising n replicas, the method implementing a Byzantine fault tolerant (BFT) state machine replication (SMR) protocol running on the computing system and comprising:
   receiving, for a current view number of the BFT SMR protocol, n-f NEW-VIEW messages from other replicas in the n replicas, wherein f is a maximum number of replicas in the n replicas that may be faulty, and wherein each NEW-VIEW message in the n-f NEW-VIEW messages includes a null or non-null quorum certificate, a view delta value, and a signature share;
   selecting a high quorum certificate from among the non-null quorum certificates in the n-f NEW-VIEW messages, the high quorum certificate being a quorum certificate associated with a highest view number;
   converting the view delta value in each NEW-VIEW message into a bit vector, resulting in n-f bit vectors;
   combining the n-f bit vectors into a bit vector set;
   computing an aggregate signature by multiplying together the signatures shares in the n-f NEW-VIEW messages;
   creating a PREPARE message that includes the current view number, the high quorum certificate, the bit vector set, and the aggregate signature; and
   broadcasting the PREPARE message to the n replicas.

9. The non-transitory computer readable storage medium of claim 8 wherein, for each NEW-VIEW message in the n-f NEW-VIEW messages received from a replica i in the n replicas, the signature share included in the NEW-VIEW message is computed by:
   calculating a hash of the current view number; and
   raising the hash by an exponent that is computed as $\Pi_{j=1,\ldots,t} b_j \cdot sk_{i,j}$, wherein t is a number of bits used to represent the view delta value included in the NEW-VIEW message in binary form, wherein $b_j$ is a jth bit of the view delta value in binary form, and wherein $sk_{i,j}$ for $j=1, \ldots, t$ correspond to a set of secret keys of replica i.

10. The non-transitory computer readable storage medium of claim 8 wherein, for each NEW-VIEW message in the n-f NEW-VIEW messages including a non-null quorum certificate, the view delta value included in the NEW-VIEW message is a delta between the current view number and a view number associated with the non-null quorum certificate.

11. The non-transitory computer readable storage medium of claim 8 wherein upon receiving the PREPARE message, a replica r in the n replicas is configured to:
    determine that replica r is locked on a quorum certificate that is associated with a higher view number than the high quorum certificate included in the PREPARE message; and
    verify the aggregate signature included in the PREPARE message using the current view number, the bit vector set, and a plurality of public keys associated with replicas that originally transmitted in the n-f NEW-VIEW messages.

12. The non-transitory computer readable storage medium of claim 11 wherein upon determining that the verification of the aggregate signature is successful, replica r is further configured to:
    accept the PREPARE message; and
    send a PREPARE vote message to the leader replica that includes a proposal associated with the high quorum certificate included in the PREPARE message.

13. The non-transitory computer readable storage medium of claim 11 wherein upon determining that the verification of the aggregate signature is unsuccessful, replica r is further configured to:
    take no action on the PREPARE message.

14. The non-transitory computer readable storage medium of claim 8 wherein the BFT SMR protocol exhibits two rounds of communication latency, linear authenticator complexity, and optimistic responsiveness.

15. A computer system acting as a leader replica in a distributed computing system comprising n replicas, the computer system comprising:
    a processor; and
    a non-transitory computer readable medium having stored thereon program code that, when executed, causes the processor to:
        receive, for a current view number of a Byzantine fault tolerant (BFT) state machine replication (SMR) protocol running on the distributed computing system, n-f NEW-VIEW messages from other replicas in the n replicas, wherein f is a maximum number of replicas in the n replicas that may be faulty, and wherein each NEW-VIEW message in the n-f NEW-VIEW messages includes a null or non-null quorum certificate, a view delta value, and a signature share;
        select a high quorum certificate from among the non-null quorum certificates in the n-f NEW-VIEW messages, the high quorum certificate being a quorum certificate associated with a highest view number;
        convert the view delta value in each NEW-VIEW message into a bit vector, resulting in n-f bit vectors;
        combine the n-f bit vectors into a bit vector set;
        compute an aggregate signature by multiplying together the signatures shares in the n-f NEW-VIEW messages;
        create a PREPARE message that includes the current view number, the high quorum certificate, the bit vector set, and the aggregate signature; and
        broadcast the PREPARE message to the n replicas.

16. The computer system of claim 15 wherein, for each NEW-VIEW message in the n-f NEW-VIEW messages received from a replica i in the n replicas, the signature share included in the NEW-VIEW message is computed by:
    calculating a hash of the current view number; and
    raising the hash by an exponent that is computed as $\Pi_{j=1, \ldots, t} b_j \cdot sk_{i,j}$, wherein t is a number of bits used to represent the view delta value included in the NEW-VIEW message in binary form, wherein $b_1$ is a jth bit of the view delta value in binary form, and wherein $sk_{i,j}$ for $j=1, \ldots, t$ correspond to a set of secret keys of replica i.

17. The computer system of claim 15 wherein, for each NEW-VIEW message in the n-f NEW-VIEW messages including a non-null quorum certificate, the view delta value included in the NEW-VIEW message is a delta between the current view number and a view number associated with the non-null quorum certificate.

18. The computer system of claim 15 wherein upon receiving the PREPARE message, a replica r in the n replicas is configured to:
    determine that replica r is locked on a quorum certificate that is associated with a higher view number than the high quorum certificate included in the PREPARE message; and
    verify the aggregate signature included in the PREPARE message using the current view number, the bit vector set, and a plurality of public keys associated with replicas that originally transmitted in the n-f NEW-VIEW messages.

19. The computer system of claim 18 wherein upon determining that the verification of the aggregate signature is successful, replica r is further configured to:
    accept the PREPARE message; and
    send a PREPARE vote message to the leader replica that includes a proposal associated with the high quorum certificate included in the PREPARE message.

20. The computer system of claim 18 wherein upon determining that the verification of the aggregate signature is unsuccessful, replica r is further configured to:
    take no action on the PREPARE message.

21. The computer system of claim 15 wherein the BFT SMR protocol exhibits two rounds of communication latency, linear authenticator complexity, and optimistic responsiveness.

* * * * *